Jan. 30, 1968          D. E. ROBINSON          3,365,949
PRESSURE SENSING, INDICATING AND/OR CONTROL MEANS
Filed Oct. 5, 1965
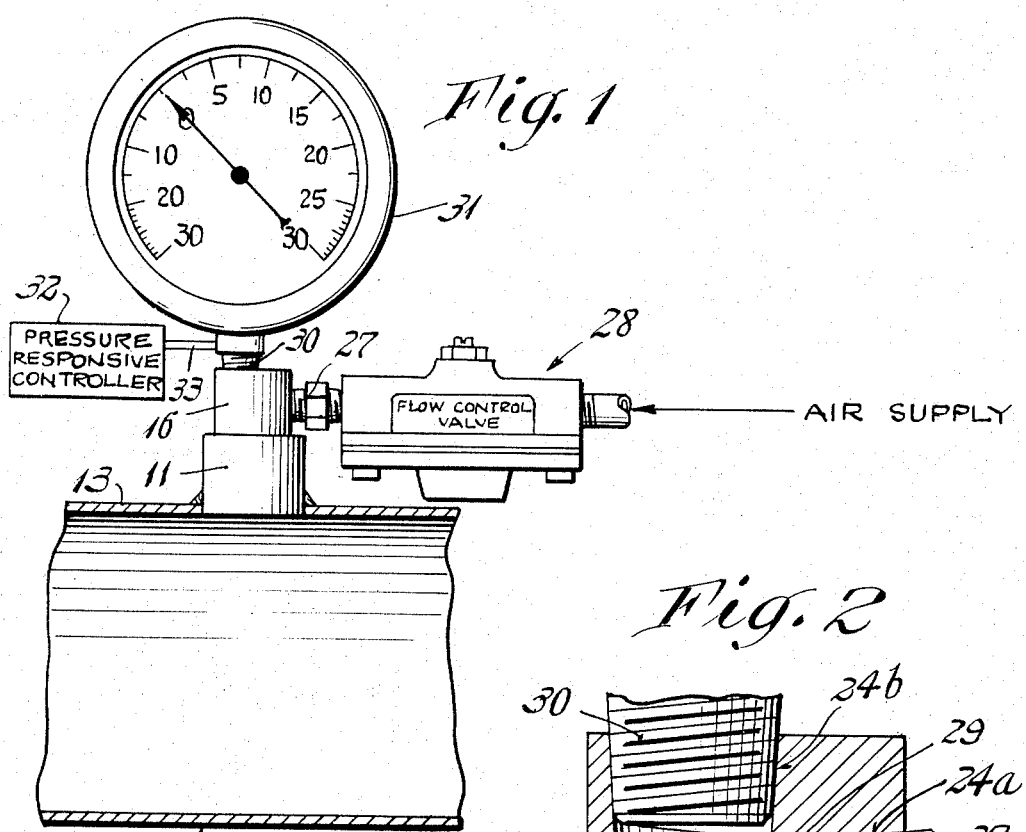
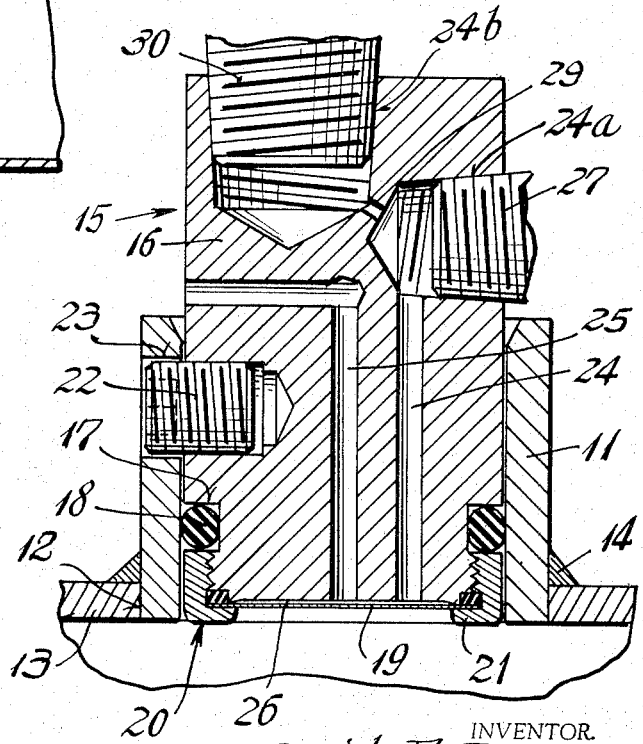
INVENTOR.
David E. Robinson
BY
Johnson and Kline
ATTORNEYS

United States Patent Office 3,365,949
Patented Jan. 30, 1968

3,365,949
PRESSURE SENSING, INDICATING AND/OR CONTROL MEANS
David E. Robinson, Norwalk, Conn., assignor to Paper Machine Components, Incorporated, Norwalk, Conn., a corporation of Connecticut
Filed Oct. 5, 1965, Ser. No. 493,209
9 Claims. (Cl. 73—406)

ABSTRACT OF THE DISCLOSURE

A device for indicating and/or controlling the pressure in a container, conduit or the like having a readily removable transmitter having an O-ring seal and a replaceable diaphragm which is disposed substantially in the plane of the wall of the container so as to avoid interference of the flow of material therein and control an air flow in response to pressure in the container to develop a back pressure equal to the pressure in the container which back pressure actuates a gauge or control means, the transmitter having a clamping ring forming a side wall for a groove for said O-ring and also clamping the diaphragm in position on the transmitter.

---

It is an object of the invention to provide a device for accurately determining the pressure in a fluid in a container, conduit or the like which is easy to construct, install and service and is simple and effective in its operation.

A feature of the invention resides in a pressure transmitter embodying a flexible diaphragm sealingly disposed in a hole in the wall of a container, conduit or the like with the diaphragm located in the plane of the wall thereof, so as to avoid interference of the flow of fluid therein, and flexing in response to the pressure of the fluid in the container, conduit or the like to control an air flow of predetermined value in excess of the pressures to be measured or indicated in such a manner that back pressure is built up equal to the pressure in the container which actuates a pressure gauge or controller to indicate and/or control the pressure in the container without the material in the container being interfered with or contaminated from the outside.

Other features and advantages of the invention will be apparent from the specification and claims when considered in connection with the accompanying drawing in which:

FIGURE 1 shows a view, partly in section, of the device of the present invention disposed on the conduit; and FIG. 2 is an enlarged sectional view of the pressure transmitter.

While the invention can be employed in connection with tanks, containers, as well as with conduits containing fluid, it is herein illustrated as related to a conduit or pipe 10 for transmitting a fluid material. As shown in FIG. 1 the device is provided with a mounting member or nipple 11 having its lower end secured in a hole 12 in the side wall 13 of the pipe 10 as by welding 14 or the like so as to be substantially flush with the interior of the wall. The nipple slidably receives the pressure transmitter 15 which, as shown in FIG. 2, comprises a body member 16 provided with a groove 17 in its outer wall adjacent its inner end for receiving an O-ring 18 which seals the body in the nipple. The inner end of the body has extending thereover in sealing relation therewith a flexible diaphragm 19. Preferably the diaphragm has its edges clamped to the body by a clamping ring 20 threaded thereon and provided with a clamping flange 21.

It will be noted that the clamping ring also forms one wall of the groove 17 so that by removing the clamping ring 20 both the diaphragm and O-ring can be readily removed to be serviced or replaced when the body is removed from the nipple.

The body is releasably held in the nipple by a set screw 22 passing through a hole 23 in the nipple and secured to the body. This accurately locates the body in the nipple whenever assembled and enables the body to be readily removed for servicing without requiring the destroying of the welded connection of the nipple to the pipe.

When the body is so positioned in the mounting means it will locate the diaphragm 19 substantially flush with the inner wall of the conduit and in position to be directly in contact with the material therein. With the nipple and diaphragm so positioned the device will not interfere with the flow of fluid or trap portions of the material in the conduit as might affect the readings to be taken. This is particularly true when the fluid contains solids such as are encountered in paper making. Also this position of the device permits cleaning of the pipe or conduit by a cleaning tool passed through the pipe without interference by or requiring removal of the device from the pipe.

The body has a pair of passages therein. The inlet passage 24 and exhaust passage 25 each have one end communicating with the chamber 26 between the end of the body and the diaphragm positioned thereover as shown in FIG. 2 to form a pressure chamber. The passage 24 has its other end connected to a threaded socket 24a for receiving a coupling means 27 connected to a controlled air supply which may include a needle valve or any suitable flow control means 28 preferably responsive to back pressure in the passage 24 for increasing the flow. A port 29 extends from socket 24a to a second threaded socket 24b for receiving a coupling 30 connected to a pressure gauge 31 as shown in FIG. 1 which is set to measure and/or indicate back pressure, and thus connects the gauge to the pressure chamber to be operated by the back pressure built up therein. The other end of the passage 25 in the body exhausts the pressure chamber to the atmosphere.

With this construction, air having a controlled pressure slightly above the maximum pressure to be measured in the conduit (3 to 5 p.s.i. is usually sufficient) is fed from the supply into the passage 24. If there is no material in the conduit or pipe 10 to flex the diaphragm the air is free to flow from the inlet passage to the exhaust passage. Under this circumstance there will be no back pressure built up in the pressure chamber which is connected to the gauge and no pressure will be shown thereon. As the pressure in the material that is in the conduit builds up it will move the diaphragm against the pressure of the air flowing through the passages so as to block passage 24 and restrict or obstruct the flow of air through the transmitter, causing a build-up in back pressure in the chamber connected to the gauge, until an equilibrium is reached and the diaphragm will be in the normal position shown in full lines in FIG. 2. The gauge will show the back pressure in the chamber 26 which will be an indication of the pressure in the pipe. In this normal position the pressure in the air supply will normally hold the diaphragm slightly out of engagement with the exhaust passage so that there will always be a slight bleeding of the air therethrough to insure full balanced condition in which the back pressure does not exceed the pressure in the conduit so that an accurate measurement of the pressure in the fluid will be indicated by the gauge.

If it is desired to control any apparatus connected to the pipe or conduit or to control the flow of material in the pipe in accordance with the pressure of the material in the pipe, a pressure responsive controller 32 of any suitable type can be connected to the back pressure chamber to be actuated by the pressure therein. As herein illustrated, it is connected by a line 33 to the coupler for the gauge which is connected through port 29 and the passage 24 to the chamber 26.

Thus it will be seen that the device of the present invention is simple in its construction, easily assembled, and readily mounted on a container, conduit or the like to sense, indicate and/or to effect a control by the pressure of the fluid in the pipe. Also the end of the mounting means for the device and the diaphragm are maintained in substantially the plane of the inner surface of the walls of a conduit whereby cleaning of the conduit is enhanced and the flow of fluid is not altered as might affect the indication of the pressure therein. Another feature of the construction is the ease of servicing the device, if it is required to replace either the diaphragm or the sealing O-ring, without the necessity of unwelding or otherwise removing the unit from the pipe or conduit since it can be readily removed by the release of the set screw which will automatically accurately locate the transmitter and diaphragm on the pipe when replaced thereon.

Thus, among others, the several objects and advantages of the invention as aforenoted are achieved. Obviously numerous changes in the structure may be resorted to without departing from the spirit of the invention as defined by the claims.

I claim:

1. A device for sensing the pressure in a container having a wall formed with an opening therethrough comprising in combination a pressure transmitter having a pressure chamber therein sealably connected to said wall for closing said opening, means for supplying air under pressure to said pressure chamber, and means for indicating the air pressure in said pressure chamber; said pressure transmitter comprising a mounting member having a mounting recess therethrough sealably secured to said wall of the container and having an inner end extending through the opening therein and ending substantially flush with the inner surface of said wall and a transmitter member removably sealably mounted within said mounting recess, said transmitter member including a body having an inner end providing a surface disposed adjacent said inner end of said mounting member and a pressure sensitive flexible diaphragm removably sealably connected to said body to overlie the said surface thereof, the said surface of the body and the diaphragm defining therebetween said pressure chamber, said body being formed with an inlet passage and an exhaust passage for respectively connecting said pressure chamber with said air supply means and the atmosphere and having means therein for connecting said pressure chamber with said indicating means, said diaphragm being disposed substantially flush with the inner surface of said container wall and normally being in an unflexed position of equilibrium between said container and pressure chamber when the pressures therein are equal, said diaphragm being flexed in the direction of said body when the pressure in said container exceeds the pressure in said pressure chamber for closing said exhaust passage to impede the flow of air and to cause a back pressure in said pressure chamber and being flexed away from said body to said normal position of equilibrium when said back pressure equals the pressure in the container, said exhaust passage venting the pressure chamber to the atmosphere so that the pressure therein does not exceed the pressure in the container, whereby said means indicating the pressure in the pressure chamber also indicates the pressure in the container.

2. A device for sensing and indicating the pressure in a container having a wall formed with an opening therethrough comprising in combination a pressure transmitter having a pressure chamber therein sealably connected to said wall for closing said opening, means operable for controllably supplying air under pressure to said pressure chamber, and means for indicating the air pressure in said pressure chamber; said pressure transmitter comprising a mounting member having a mounting recess therethrough sealably secured to said wall of the container and having an inner end extending through the opening therein and ending substantially flush with the inner surface of said wall and a transmitter member removably sealably mounted within said mounting recess, said transmitter member including a body having an inner end providing a surface disposed adjacent said inner end of said mounting member and a pressure sensitive flexible diaphragm removably sealably connected to said body to overlie the said surface thereof, the said surface of the body and the diaphragm defining therebetween said pressure chamber, said body being formed with an inlet passage and an exhaust passage for respectively connecting said pressure chamber with said air supply means and the atmosphere and having means therein for connecting said pressure chamber with said indicating means, said diaphragm being disposed substantially flush with the inner surface of said container wall and normally being in an unflexed position of equilibrium between said container and pressure chamber when the pressures therein are equal, said diaphragm being flexed in the direction of said body when the pressure in said container exceeds the pressure in said pressure chamber for closing said exhaust passage and being flexed away from said body to said normal position of equilibrium when said air supply means is operated to supply air to said pressure chamber, said exhaust passage venting the pressure chamber to the atmosphere so that the pressure therein does not exceed the pressure in the container, whereby said means indicating the pressure in the pressure chamber also indicates the pressure in the container.

3. A device for sensing the pressure in a container having a wall formed with an opening therethrough comprising in combination a pressure transmitter having a pressure chamber therein sealably connected to said wall for closing said opening, means operable for controllably supplying air under pressure to said pressure chamber, and means for indicating the air pressure in said pressure chamber; said pressure transmitter comprsing a mounting member having a mounting recess therethrough sealably secured to said wall of the container and having an inner end extending through the opening therein and ending substantially flush with the inner surface of said wall and a transmitter member removably sealably mounted within said mounting recess, said transmitter member including a body having an inner end providing a surface disposed adjacent said inner end of said mounting member and a pressure sensitive flexible diaphragm removably sealably connected to said body to overlie the said surface thereof, the said surface of the body and the diaphragm defining therebetween said pressure chamber, said body being formed with an inlet passage and an exhaust passage for respectively connecting said pressure chamber with said air supply means and the atmosphere and having means therein for connecting said pressure chamber with said indicating means, said diaphragm being disposed substantially flush with the inner surface of said container wall and normally being in an unflexed position of equilibrium between said container and pressure chamber when the pressures therein are equal, said diaphragm being flexed in the direction of said body when the pressure in said container exceeds the pressure in said pressure chamber for closing said exhaust passage, said air supply means being operated in response to the closing of said exhaust passage for supplying air to said pressure chamber for flexing said diaphragm away from said body to said normal position of equilibrium wherein said exhaust passage is open, said exhaust passage venting the pressure chamber to the atmosphere so that the pressure therein does not exceed the pressure in the container, whereby said means indicating the pressure in the pressure chamber also indicates the pressure in the container.

4. A device for sensing the pressure in a container having a wall formed with an opening therethrough comprising in combination a pressure transmitter having a pressure chamber therein sealably connected to said wall for closing said opening, means operable for controllably supplying air under pressure to said pressure chamber, and means for indicating the air pressure in said pressure chamber; said pressure transmitter comprising a mounting member having a mounting recess therethrough sealably secured to said wall of the container and having an inner end extending through the opening therein and ending substantially flush with the inner surface of said wall, a transmitter member removably sealably mounted within said mounting recess and means cooperating between said mounting member and transmitter member for locking said members together and predeterminately locating said transmitter member in said recess, said transmitter member including a body having an inner end providing a surface disposed adjacent said inner end of said mounting member and a pressure sensitive flexible diaphragm removably sealably connected to said body to overlie the said surface thereof, the said surface of the body and the diaphragm defining therebetween said pressure chamber, said body being formed with an inlet passage and an exhaust passage for respectively connecting said pressure chamber with said air supply means and the atmosphere and having means therein for connecting said pressure chamber with said indicating means, said diaphragm being disposed substantially flush with the inner surface of said container wall and normally being in an unflexed position of equilibrium between said container and pressure chamber when the pressures therein are equal, said diaphragm being flexed in the direction of said body when the pressure in said container exceeds the pressure in said pressure chamber for closing said exhaust passage and being flexed away from said body to said normal position of equilibrium when said air supply means is operated to supply air to said pressure chamber, said exhaust passage venting the pressure chamber to the atmosphere so that the pressure therein does not exceed the pressure in the container, whereby said means indicating the pressure in the pressure chamber also indicates the pressure in the container.

5. A device for sensing the pressure in a container having a wall formed with an opening therethrough comprising in combination a pressure transmitter having a pressure chamber therein sealably connected to said wall for closing said opening, means operable for controllably supplying air under pressure to said pressure chamber, and means for indicating the air pressure in said pressure chamber; said pressure transmitter comprising a mounting member having a cylindrical bore therethrough sealably secured to said wall of the container and having an inner end extending through the opening therein and ending substantially flush with the inner surface of said wall, a transmitter member including a cylindrical body substantially conforming with said bore in said mounting member removably sealably mounted within said bore and means extending transversely of said body between said mounting member and body for predeterminately locating the latter in said bore, said body having an inner end providing a surface disposed adjacent said inner end of said mounting member and a pressure sensitive flexible diaphragm removably sealably connected to said inner end of said body to overlie the said surface thereof, the said surface of the body and the diaphragm defining therebetween said pressure chamber, said body being formed with an inlet passage and an exhaust passage for respectively connecting said pressure chamber with said air supply means and the atmosphere and having means therein for connecting said pressure chamber with said indicating means, said diaphragm being disposed substantially flush with the inner surface of said container wall and normally being in an unflexed position of equilibrium between said container and pressure chamber when the pressures therein are equal, said diaphragm being flexed in the direction of said body when the pressure in said container exceeds the pressure in said pressure chamber for closing said exhaust passage and being flexed away from said body to said normal position of equilibrium when said air supply means is operated to supply air to said pressure chamber, said exhaust passage venting the pressure chamber to the atmosphere so that the pressure therein does not exceed the pressure in the container, whereby said means indicating the pressure in the pressure chamber also indicates the pressure in the container.

6. A device for sensing the pressure in a container having a wall formed with an opening therethrough comprising in combination a pressure transmitter having a pressure chamber therein sealably connected to said wall for closing said opening, means operable for controllably supplying air under pressure to said pressure chamber, and means for indicating the air pressure in said pressure chamber; said pressure transmitter comprising a mounting member having a mounting recess therethrough sealably secured to said wall of the container and having an inner end extending through the opening therein and ending substantially flush with the inner surface of said wall, a transmitter member including a substantially solid body slidably removably mounted within said mounting recess, resilient means cooperating between said body and the wall of said recess for sealing the space therebetween and means cooperating between said body and said mounting member for predeterminately positioning said body in said recess and locking it therein, said body having an inner end providing a surface disposed adjacent said inner end of said mounting member and a substantially flat pressure sensitive flexible diaphragm removably sealably connected to said inner end of said body to overlie the said surface thereof, the said surface of the body and the diaphragm defining therebetween said pressure chamber, said body being formed with an inlet passage and an exhaust passage opening through said surface for respectively connecting said pressure chamber with said air supply means and the atmosphere and having means therein for connecting said pressure chamber with said indicating means, said diaphragm being disposed substantially flush with the inner surface of said container wall and normally being in an unflexed position of equilibrium between said container and pressure chamber when the pressures therein are equal, said diaphragm being flexed in the direction of said body when the pressure in said container exceeds the pressure in said pressure chamber for closing said exhaust passage and being flexed away from said body to said normal position of equilibrium when said air supply means is operated to supply air to said pressure chamber, said exhaust passage venting the pressure chamber to the atmosphere so that the pressure therein does not exceed the pressure in the container, whereby said means indicating the pressure in the pressure chamber also indicates the pressure in the container.

7. A device for sensing the pressure in a container having a wall formed with an opening therethrough comprising in combination a pressure transmitter having a pressure chamber therein sealably connected to said wall for closing said opening, means operable for controllably supplying air under pressure to said pressure chamber, and means for indicating the air pressure in said pressure chamber; said pressure transmitter comprising a mounting member having a cylindrical mounting recess therethrough sealably secured to said wall of the container and having an inner end extending through the opening therein and ending substantially flush with the inner surface of said wall, a transmitter member including a substantially solid cylindrical body slidably removably mounted within said mounting recess, said body being formed with a peripheral groove therearound for receiving a resilient O-ring, said O-ring being compressible between the wall of said recess and said body for sealing the space therebetween, and means cooperating between said body and mounting member for locking the latter in said recess and predeterminately locating it therein, said body having an inner end providing a surface disposed adjacent said inner end of said mounting member and a pressure sensitive flexible diaphragm removably sealably connected to said inner end of said body to overlie the said surface thereof, the said surface of the body and the diaphragm defining therebetween said pressure chamber, said body being formed with an inlet passage and an exhaust opening through said surface for respectively connecting said pressure chamber with said air supply means and the atmosphere and having means therein for connecting said pressure chamber with said indicating means, said diaphragm being disposed substantially flush with the inner surface of said container wall and normally being in an unflexed position of equilibrium between said container and pressure chamber when the pressures therein are equal, said diaphragm being fixed in the direction of said body when the pressure in said container exceeds the pressure in said pressure chamber for closing said exhaust passage and being flexed away from said body to said normal position of equilibrium when said air supply means is operated to supply air to said pressure chamber, said exhaust passage venting the pressure chamber to the atmosphere so that the pressure therein does not exceed the pressure in the container, whereby said means indicating the pressure in the pressure chamber also indicates the pressure in the container.

8. A device for sensing the pressure in a container having a wall formed with an opening therethrough comprising in combination a pressure transmitter having a pressure chamber therein sealably connected to said wall for closing said opening, means operable for controllably supplying air under pressure to said pressure chamber, and means for indicating the air pressure in said pressure chamber; said pressure transmitter comprising a sleeve having a cylindrical mounting recess therethrough sealably secured to said wall of the container and having an inner end extending through the opening therein and ending substantially flush with the inner surface of said wall, a transmitter member including a cylindrical body slidably removably mounted within said recess, resilient means cooperating between said body and the wall of said recess for sealing the space therebetween, and threaded fastener means removably threaded into aligned transverse threaded bores formed in said sleeve and said body for predeterminately positioning said body in said recess and locking it therein, said body having an inner end providing a surface disposed adjacent said inner end of said mounting member and a pressure sensitive flexible diaphragm removably sealably connected to said inner end of said body to overlie the said surface thereof, the said surface of the body and the diaphragm defining therebetween said pressure chamber, said body being formed with an inlet passage and an exhaust passage for respectively connecting said pressure chamber with said air supply means and the atmosphere and having means therein for connecting said pressure chamber with said indicating means, said diaphragm being disposed substantially flush with the inner surface of said contained wall and normally being in an unflexed position of equilibrium between said container and pressure chamber when the pressures therein are equal, said diaphragm being flexed in the direction of said body when the pressure in said container exceeds the pressure in said pressure chamber for closing said exhaust passage and being flexed away from said body to said normal position of equilibrium when said air supply means is operated to supply air to said pressure chamber, said exhaust passage venting the pressure chamber to the atmosphere so that the pressure therein does not exceed the pressure in the container, whereby said means indicating the pressure in the pressure chamber also indicates the pressure in the container.

9. A device adapted to be mounted on a container having a wall formed with an opening therethrough for sensing and indicating the pressure within the container comprising a mounting member secured to said wall of the container and having an inner end extending through the opening therein and ending substantially flush with the inner surface of said wall and a transmitter member removably and accurately mounted within said mounting member and having an inner end providing a surface disposed adjacent said inner end of said mounting member, said transmitter having an annular groove in the side wall adjacent said inner end thereof and having an O-ring therein sealingly engaging the mounting member and a removable pressure sensitive flexible diaphragm overlying said end surface thereof, a clamping ring mounted on the end of the transmitter and having an inturned flange at one end engaging the edge of and releasably securing the diaphragm in position on the transmitter and having at the other end a portion forming a wall of said groove whereby removal of the clamping means upon withdrawal of the transmitter from the mounting member frees the O-ring and diaphragm for removal therefrom, and means on the transmitter responsive to the action of the pressure sensitive diaphragm for indicating the pressure in said container.

References Cited
UNITED STATES PATENTS

| | | | |
|---|---|---|---|
| 2,749,744 | 6/1956 | Doudera et al. | 73—408 X |
| 2,902,861 | 9/1959 | Frost et al. | 73—408 |
| 3,247,719 | 4/1966 | Chelner | 73—406 XR |

FOREIGN PATENTS

| | | |
|---|---|---|
| 993,997 | 6/1965 | Great Britain. |

DAVID SCHONBERG, *Primary Examiner.*

LOUIS R. PRINCE, *Examiner.*

D. O. WOODIEL, *Assistant Examiner.*

UNITED STATES PATENT OFFICE
CERTIFICATE OF CORRECTION

Patent No. 3,365,949                      January 30, 1968

David E. Robinson

It is hereby certified that error appears in the above numbered patent requiring correction and that the said Letters Patent should read as corrected below.

Column 7, line 7, before "opening" insert -- passage --; line 15, for "fixed" read -- flexed --; column 8, line 3, for "contained" read -- container --.

Signed and sealed this 18th day of March 1969.

(SEAL)
Attest:

Edward M. Fletcher, Jr.                     EDWARD J. BRENNER
Attesting Officer                              Commissioner of Patents